United States Patent
Lyons

(10) Patent No.: US 6,792,714 B1
(45) Date of Patent: Sep. 21, 2004

(54) SEEDLING RAISING DEVICE, METHOD OF MAKING AND METHOD OF USING

(76) Inventor: Tamara J. Lyons, 2525 Paul St., Eau Claire, WI (US) 54701

(*) Notice: Subject to any disclaimer, the term of this patent is extended or adjusted under 35 U.S.C. 154(b) by 0 days.

(21) Appl. No.: 10/413,719

(22) Filed: Apr. 15, 2003

(51) Int. Cl.⁷ .................................................. A01C 1/04
(52) U.S. Cl. ......................................... 47/56; 111/199
(58) Field of Search ..................... 47/58.1, 56; 111/199

(56) References Cited

U.S. PATENT DOCUMENTS

| | | | | |
|---|---|---|---|---|
| 2,197,594 A | * | 4/1940 | Rowell ............................ | 47/56 |
| 3,643,795 A | * | 2/1972 | Watwood et al. ............. | 206/756 |
| 3,817,042 A | * | 6/1974 | Sanderson ..................... | 111/199 |
| 4,080,755 A | * | 3/1978 | Crosby ........................... | 47/56 |
| 4,196,533 A | * | 4/1980 | Kamphausen ................. | 40/645 |
| 4,845,888 A | * | 7/1989 | Lahalih et al. ................. | 47/9 |
| 5,099,772 A | * | 3/1992 | Murray .......................... | 111/92 |
| 5,266,097 A | * | 11/1993 | Moore ............................ | 71/28 |
| 5,630,292 A | * | 5/1997 | Heinz et al. ................... | 47/46 |
| 5,720,129 A | * | 2/1998 | Lantinberg ..................... | 47/56 |

FOREIGN PATENT DOCUMENTS

| | | | | |
|---|---|---|---|---|
| GB | 2197774 A | * | 6/1988 | ............ A01C/1/04 |
| JP | 404183305 A | * | 6/1992 | ............ A01C/1/04 |
| JP | 7289025 A | * | 11/1995 | ............ A01C/1/04 |
| JP | 2000038725 A | * | 2/2000 | ........... E02D/17/20 |

* cited by examiner

Primary Examiner—Son T Nguyen

(57) ABSTRACT

A seedling raising sheet device, a method of making same and a method of using the device for use in conveniently laying out a garden are disclosed. The device includes an elongated biodegradable paper strip, a plurality of distance markers, an adhesive layer, a plurality of seeds, a fertilizer, a plurality of stakes, and a sticker sheet. The paper strip, plurality of distance markers, adhesive layer, plurality of seeds, and fertilizer are interconnected together to form a linear means for planting the plurality of seeds within a furrow of a garden. The sticker sheet contains a plurality of labels that a elongated biodegradable paper strip, said paper strip having a front surface and a back surface;

- a plurality of distance markers embossed on the front surface of said paper strip;
- an adhesive layer attached to the front surface of said paper strip;
- a plurality of seeds attached to said adhesive layer;
- a fertilizer attached to said adhesive layer;
- a plurality of stakes; and
- a sticker sheet having a plurality of labels reversibly attached to said sticker sheet are removable and attachable onto the stakes. The method of making includes the steps of embossing, mounting, printing, slicing, spraying, sprinkling, and trimming. The method of making includes the steps of cutting, burying, hoeing, obtaining, placing, and stretching.

2 Claims, 2 Drawing Sheets

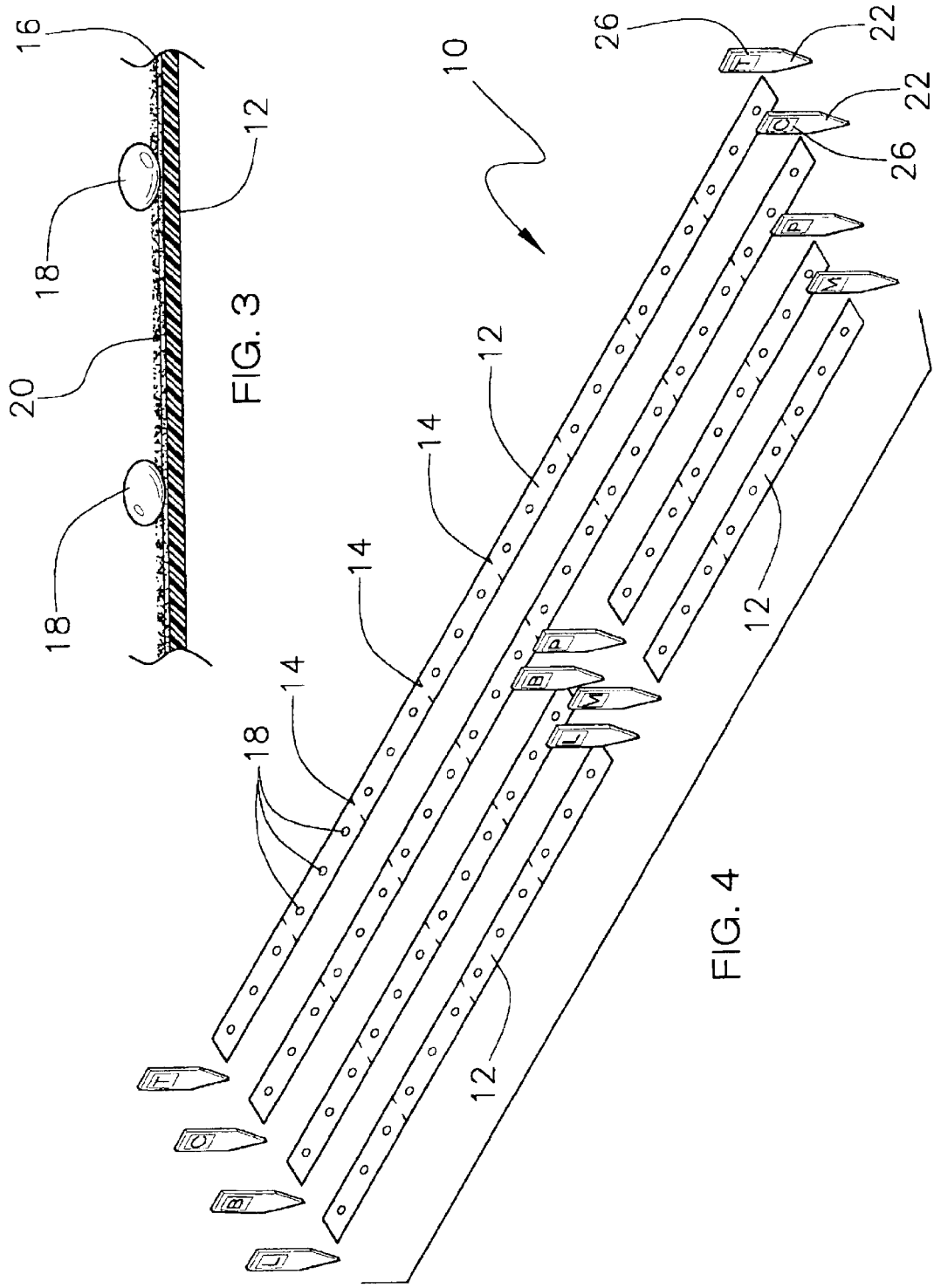

SEEDLING RAISING DEVICE, METHOD OF MAKING AND METHOD OF USING

FIELD OF THE INVENTION

The present invention relates to gardening equipment, more particularly, to a seedling raising device, a method of making the same and a method of using the same to as a convenient means for planting linear rows of plurality of seeds within a garden.

DESCRIPTION OF THE PRIOR ART

Normally, in home gardening or small-scale farming, plant seed are individually placed directly into the ground along relatively linear furrows. This labor extensive effort may lead to various undesirable effects, such as, back strain, boredom, and alike. Therefore a new means for planting seeds along relatively linear furrows which overcomes many of the these unwanted effects is desirable.

A wide variety of gardening devices is currently available on the commercial market and an even larger number of these types of devices are known in the art of gardening devices, for example, the mat with seed and method of producing same disclosed by Taniguschi et al. in U.S. Pat. No. 5,245,785; the light weight seeding sheet disclosed by Ecer in U.S. Pat. No. 5,417,010; the vegetation mat disclosed by Sakate et al. in U.S. Pat. No. 5,421,123; the method for producing and packing simple seedbed with seeds disclosed by Saito in U.S. Pat. No. 5,974,732; and the seeding raising sheet, method of manufacturing same, seeling raising method, culturing method, and transplanter disclosed by Otake et al. in U.S. Pat. No. 6,240,674.

While all of the above-described devices fulfill their respective, particular objectives and requirements, the aforementioned patents do not describe a seedling raising device having an elongated biodegradable paper strip, a plurality of distance markers, an adhesive layer, a plurality of seeds, a fertilizer, a plurality of stakes, and a sticker sheet in which the paper strip, plurality of distance markers, adhesive layer, plurality of seeds, and fertilizer are interconnected together. This combination of elements would specifically match the user's particular individual needs of making it possible to form a convenient means for planting linear rows of plurality of seeds within a garden. The above-described patents make no provision for a seedling raising device having an elongated biodegradable paper strip, a plurality of distance markers, an adhesive layer, a plurality of seeds, a fertilizer, a plurality of stakes, and a sticker sheet in which the paper strip, plurality of distance markers, adhesive layer, plurality of seeds, and fertilizer are interconnected together.

Therefore, a need exists for a new and improved seedling raising device having an elongated biodegradable paper strip, a plurality of distance markers, an adhesive layer, a plurality of seeds, a fertilizer, a plurality of stakes, and a sticker sheet in which the paper strip, plurality of distance markers, adhesive layer, plurality of seeds, and fertilizer are interconnected together. In this respect, the seedling raising device according to the present invention substantially departs from the conventional concepts and designs of the prior art, and in doing so provides an apparatus primarily developed for the purpose of providing a convenient means for planting linear rows of plurality of seeds within a garden.

SUMMARY OF THE INVENTION

The present device, method of making and method of using, according to the principles of the present invention, overcomes the shortcomings of the prior art by providing a unique seedling raising device and associated methods. The device includes an elongated biodegradable paper strip, a plurality of distance markers, an adhesive layer, a plurality of seeds, a fertilizer, a plurality of stakes, and a sticker sheet. The paper strip, plurality of distance markers, adhesive layer, plurality of seeds, and fertilizer are interconnected together to form a linear means for planting the plurality of seeds within a furrow of a garden. The sticker sheet contains a plurality of labels which are removable and attachable onto the stakes. The method of making includes the steps of embossing, mounting, printing, slicing, spraying, sprinkling, and trimming. The method of making includes the steps of cutting, burying, hoeing, obtaining, placing, and stretching.

In view of the foregoing disadvantages inherent in the known type seedling raising devices now present in the prior art, the present invention provides an improved seedling raising device, which will be described subsequently in great detail, is to provide a new and improved seedling raising device which is not anticipated, rendered obvious, suggested, or even implied by the prior art, either alone or in any combination thereof.

To attain this, the present invention essentially comprises an biodegradable paper strip having embossed distance markers and an adhesive layer, with seeds and fertilizer attached to the adhesive layer, along with stakes and a sheet of labeling stickers.

There has thus been outlined, rather broadly, the more important features of the invention in order that the detailed description thereof that follows may be better understood, and in order that the present contribution of the art may be better appreciated.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved seedling raising device that has all the advantages of the prior art seedling raising device and none of the disadvantages.

It is another object of the present invention to provide a new and improved seedling raising device that may be easily and efficiently manufactured and marketed.

An even further object of the present invention is to provide a new and improved seedling raising device that has a low cost of manufacture with regard to both materials and labor, and which accordingly is then susceptible of low prices of sale to the consuming public, thereby making such multipurpose storage unit and system economically available to the buying public.

Still another object of the present invention is to provide a new seedling raising device that provides in the apparatuses and methods of the prior art some of the advantages thereof, while simultaneously overcoming some of the disadvantages normally associated therewith.

Even still another object of the present invention is to provide a seedling raising device having an elongated biodegradable paper strip, a plurality of distance markers, an adhesive layer, a plurality of seeds, a fertilizer, a plurality of stakes, and a sticker sheet in which the paper strip, plurality of distance markers, adhesive layer, plurality of seeds, and fertilizer are interconnected together. This combination of elements makes it possible to form a convenient means for planting linear rows of plurality of seeds within a garden.

Still another object of the present invention is to provide a method of making the same comprising the steps of embossing, mounting, printing, slicing, spraying, sprinkling, and trimming.

Lastly, it is an object of the present invention to provide a new and improved method of using comprising the steps of cutting, burying, hoeing, obtaining, placing, and stretching.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and description matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross sectional side view of a preferred embodiment of the seedling raising device of the present invention; and FIG. 4 is a perspective view of a preferred embodiment of the seedling raising device of the present invention.

The same reference numerals refer to the same parts throughout the various figures.

DETAILED DESCRIPTION OF THE PREFERRED EMBODIMENT

Figure 1:
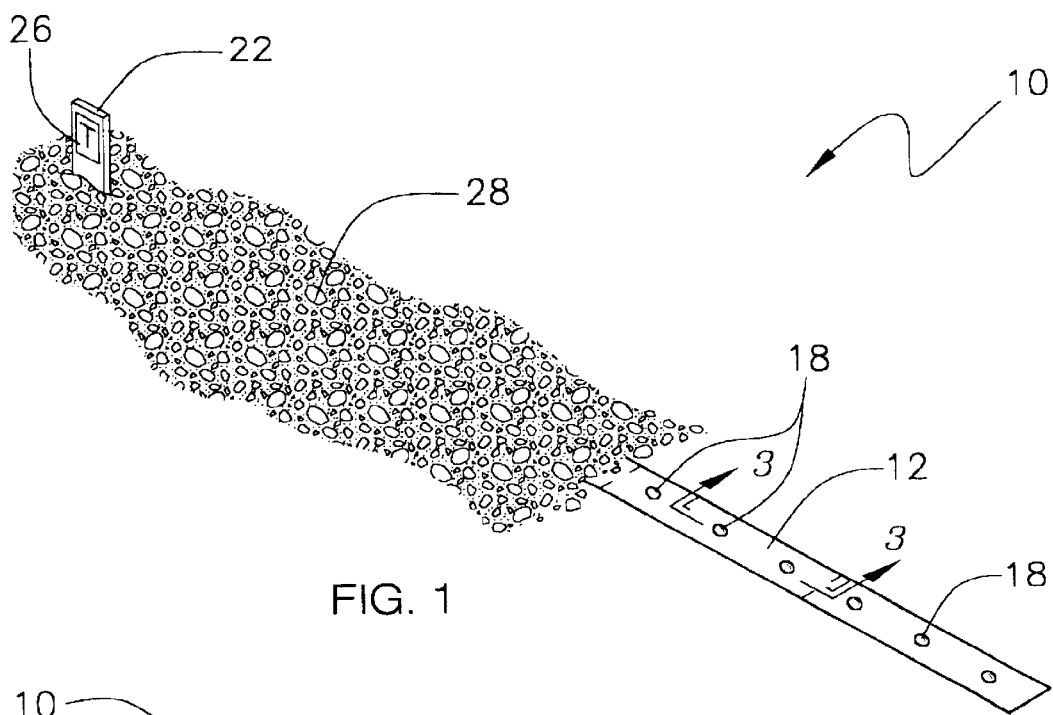
FIG. 1 is a perspective view of an preferred embodiment of the partially buried seedling raising device constructed in accordance with the principles of the present invention.

Referring now to the drawings, and in particular FIGS. 1 to 4 thereof, one preferred embodiment of the present invention is shown and generally designated by the reference numeral 10. One preferred embodiment of a seedling raising device 10 comprises: an elongated biodegradable paper strip 12, a plurality of distance markers 14, an adhesive layer 16, a plurality of seeds 18, a fertilizer 20, a plurality of stakes 22, and a sticker sheet 24. The paper strip 12 has a front surface and a back surface. The plurality of distance markers 14 is embossed on the front surface of the paper strip 12. The adhesive layer 16 is attached to the front surface of the paper strip 12. The plurality of seeds 18 is attached to the adhesive layer 16. The fertilizer 20 is attached to the adhesive layer 16. The plurality of stakes 22 having at least one tapered end for placement into soil. The sticker sheet 24 has a plurality of labels 26 reversibly attached to the sticker sheet 24.

The plurality of seeds 18 may be any commercially available type of seeds. One preferred configuration is that the plurality of seeds 18 is selected from the vegetable group consisting of carrot, tomato, radish, sweet pepper, hot pepper, yellow corn, white corn, pop corn, bean, pea, beet, cauliflower seeds 18, cabbage, cucumber, eggplant, lettuce, leek, onion, kale, parsnip, okra, pumpkin, spinach, turnip, and zucchini. Another preferred configuration is that the plurality of seeds 18 is selected from the fruit group selected from the group consisting of cantaloupe, and watermelon. Yet another preferred configuration is that the plurality of seeds 18 is selected from the herb group consisting of basil, borage, catnip, chamomile, chives, coriander, cress, dill, fennel, lavender, lemon balm, majoram, mint, oregano, parsley, pennyroyal, rosemary, sage, savory, sorrel, St. John's wort, stevia, and thyme. Still yet another preferred configuration is that the plurality of seeds 18 is selected from the annual flower group consisting of aster, baby breathe, chrysanthemum, columbine, coneflower, daisy, delphioium, dianthus, foxglove, hollyhock, lavender, lily, lobelia, lupine, pansy, poppy, and salvia.

The fertilizer 20 may be any commercially available fertilizer material. One preferred configuration of the fertilizer 20 comprises: a water soluble nitrogen component in an amount from about 0.1% w/w to about 20% w/w; a water insoluble nitrogen component in an amount from about 0.1% w/w to about 20% w/w; a phosphate component in an amount from about 0.1% w/w to about 20% w/w; a potash component in an amount from about 0.1% w/w to about 20% w/w; and a support component in an amount from about 20%/o w/w to about 99% w/w. The water insoluble nitrogen component may be selected from the group consisting of urea-formaldehyde, isobutylidene diurea, magnesium ammonium phosphate, methylene urea, sewage sludge, sulfur coated urea, and mixtures thereof. The water insoluble nitrogen component may be selected from the group consisting of seed meals, sewage sludge, dried blood, and mixtures thereof. The phosphate component may be selected from the group consisting of phosphoric acid, monobasic sodium phosphate, dibasic sodium phosphate, tribasic sodium phosphate, monobasic potassium phosphate, dibasic potassium phosphate, tribasic potassium phosphate, dibasic phosphate citrate, and mixtures thereof. The water soluble nitrogen component may be selected from the group consisting of ammonium nitrate, ammonium sulfate, diammonium citrate, cobaltous ammonium sulfate, ammonium nitrate, diammonium hydrogen phosphate, ammonium diphosphate, ammonium oxalate, ammonium sulfate, potassium nitrate, sodium nitrate, urea, and mixtures thereof. The potash component may be selected from potash, potassium nitrate, monobasic potassium phosphate, dibasic potassium phosphate, tribasic potassium phosphate, and mixtures thereof. The support component may be selected from the group consisting of sand, clay, sawdust, a zeolite, and mixtures thereof.

The adhesive layer 16 may be any commercially available adhesive material. Some preferred configuration of the adhesive layer 16 may be selected from the group consisting of an animal hide adhesive, an animal bone adhesive, a rubber adhesive, a latex adhesive, a beeswax/pine tar adhesive, and a gum resin based adhesive.

The stakes 22 may be made from any commercially available material. Some preferred configurations of the stakes 22 are made of wood selected from the group consisting of pine, oak, fir, ash, aspen, elm, and walnut.

One preferred embodiment of a method of making a seedling raising device 10, the method comprising the steps of: embossing, mounting, printing, slicing, spraying, sprinkling, and trimming. The trimming step comprises trimming a paper strip 12 from a roll of paper. The embossing step comprises embossing a plurality of distance markers 14 onto a front surface of the paper strip 12. The spraying step comprises spraying an adhesive layer 16 onto the front surface of the paper strip 12. The mounting step comprises mounting a plurality of seeds 18 onto the adhesive layer 16. The sprinkling step comprises sprinkling a fertilizer 20 onto the adhesive layer 16. The slicing step comprises slicing a plurality of stakes 22. The printing step comprises printing a plurality of labels 26 onto a sticker sheet 24.

Another preferred embodiment of a method of making a seedling raising device 10, the method consist essentially of the steps of: embossing, mounting, printing, slicing, spraying, sprinkling, and trimming.

One preferred embodiment of a method of using a seedling raising device 10, the method comprising: cutting, burying, hoeing, obtaining, placing, and stretching. The obtaining step, comprises obtaining the seedling raising device 10 comprising: a elongated biodegradable paper strip 12, the paper strip 12 having a front surface and a back surface; a plurality of distance markers 14 embossed on the front surface of the paper strip 12; an adhesive layer 16 attached to the front surface of the paper strip 12; a plurality of seeds 18 attached to the adhesive layer 16; a fertilizer 20 attached to the adhesive layer 16; a plurality of stakes 22; and a sticker sheet 24 having a plurality of labels 26 reversibly attached to the sticker sheet 24. The hoeing step comprises hoeing a furrow in a garden. The stretching step comprises stretching the device 10 lengthwise along the furrow. The cutting step comprises cutting off a first section of the device 10 so that the cutoff first section of the device 10 is approximately the same length as the furrow. The placing step comprises placing the first section of the device 10 into the furrow. The burying step comprises burying the first section of the device 10 in the furrow with some dirt 28.

An additional optional set of steps may be added to the method of using further comprising the steps of: adhering, inserting, peeling, pounding, removing, and sticking. The pounding step comprises pounding a first stake 22 of the plurality of stakes 22 into a first end of the furrow. The inserting step comprises inserting a second stake 22 of the plurality of stakes 22 into a second end of the furrow. The removing step comprises removing a first label 26 from the sticker sheet 24. The sticking step comprises sticking the first label 26 onto the first stake 22. The peeling step comprises peeling off a second label 26 from the sticker sheet 24. The adhering step comprises adhering the second label 26 onto the second stake 22.

Still another set of additional steps may be added to the method of using further comprising the steps of: getting and tying. The getting step comprises getting a piece of string having a length greater than the length of the distance between the first and second stakes 22. The tying step comprises tying the string to the first and second stakes 22.

Yet another set of additional steps may be added to the method of using further comprising the steps of: pulling, and sprinkling. The sprinkling step comprises sprinkling water along the length of the furrow; and The pulling step comprises pulling any weeds that may grow along the length of the furrow.

Another preferred embodiment of a method of using a seedling raising device 10, the method consists essentially of the steps of: cutting, burying, hoeing, obtaining, placing, and stretching.

Still another preferred embodiment of a method of using a seedling raising device 10, the method consists essentially of the steps of: adhering, cutting, burying, hoeing, inserting, obtaining, peeling, placing, pounding, removing, sticking, and stretching.

Yet another preferred embodiment of a method of using a seedling raising device 10, the method consists essentially of the steps of: adhering, cutting, burying, getting, hoeing, inserting, obtaining, peeling, placing, pounding, removing, sticking, stretching, and tying.

Still yet another preferred embodiment of a method of using a seedling raising device 10, the method consists essentially of the steps of: adhering, cutting, burying, getting, hoeing, inserting, obtaining, peeling, placing, pounding, pulling, removing, sprinkling, sticking, stretching, and tying.

Referring now to FIG. 1 which depicts a perspective view of an preferred embodiment of the partially buried seedling raising device 10 showing an elongated biodegradable paper strip 12, a plurality of distance markers 14, and a-plurality of seeds 18. The plurality of distance markers 14 are shown embossed on the front surface of the paper strip 12.

Figure 2:
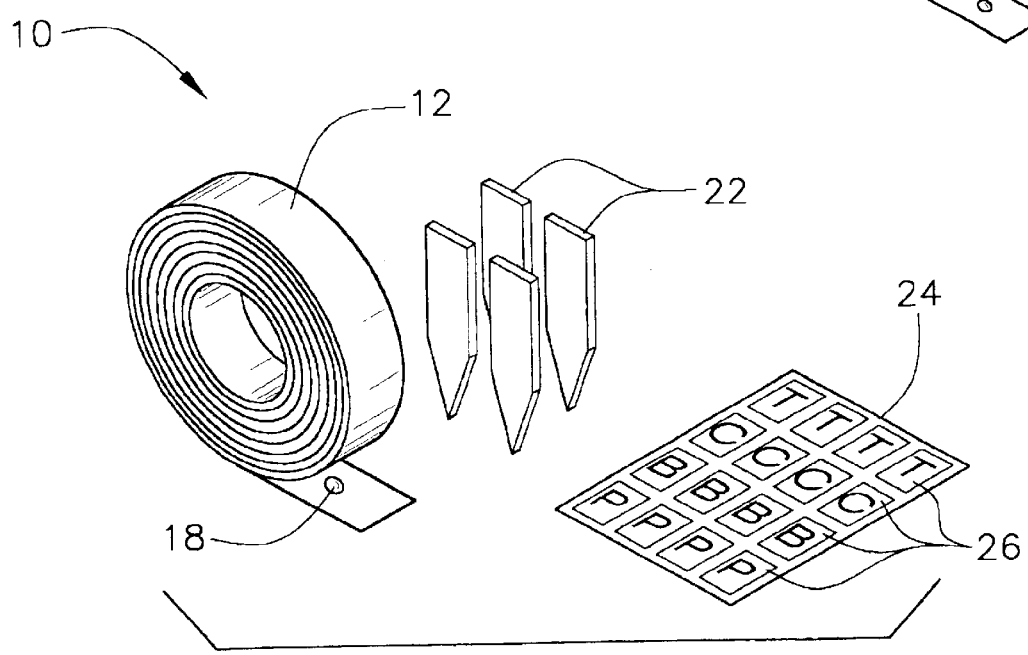
FIG. 2 is a perspective view of a preferred embodiment of the seedling raising device of the present invention.

Refer now to FIG. 2, which depicts is a perspective view of a preferred embodiment of the seedling raising device 10 showing an elongated biodegradable paper strip 12, a seed 18, a plurality of stakes 22, and a sticker sheet 24, The paper strip 12 is shown having a front surface and a back surface in which the paper strip 12 is rolled up into a roll. The plurality of stakes 22 are shown having at least one tapered end for placement into soil. The sticker sheet 24 is shown having a plurality of labels 26 reversibly attached to the sticker sheet 24.

Referring now to FIG. 3 which depicts a cross sectional side view of a preferred embodiment of the seedling raising device 10 showing an elongated biodegradable paper strip 12, an adhesive layer 16, a plurality of seeds 18, and a fertilizer 20. The adhesive layer 16 is shown attached to the front surface of the paper strip 12. The plurality of seeds 18 is shown attached to the adhesive layer 16. The fertilizer 20 is shown attached to the adhesive layer 16.

Referring now to FIG. 4 which depicts a perspective view of a preferred embodiment of the seedling raising device 10 showing a plurality of elongated biodegradable paper strips 12, a plurality of distance markers 14, a plurality of seeds 18, and a plurality of stakes 22. The paper strips 12 are shown aligned to form linear rows of various seed types.

As to the manner of usage and operation of the present invention, the same should be apparent from the above description. Accordingly, no further discussion relating to the manner of usage and operation will be provided.

While a preferred embodiment of the seedling raising device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Throughout this specification, unless the context requires otherwise, the word "comprise" or variations such as "comprises" or "comprising" or the term "includes" or variations, thereof, or the term "having" or variations, thereof will be understood to imply the inclusion of a stated element or integer or group of elements or integers but not the exclusion of any other element or integer or group of elements or integers. In this regard, in construing the claim scope, an embodiment where one or more features is added to any of the claims is to be regarded as within the scope of the invention given that the essential features of the invention as claimed are included in such an embodiment Those skilled in the art will appreciate that the invention described herein is susceptible to variations and modifications other than those specifically described. It is to be understood that the invention includes all such variations and modifications that fall within its spirit and scope. The invention also includes all of the steps, features, compositions and compounds referred to or indicated in this specification, individually or collectively, and any and all combinations of any two or more of said steps or features.

Therefore, the foregoing is considered as illustrative only of the principles of the invention. Further, since numerous modifications and changes will readily occur to those skilled in the an, it is not desired to limit the invention to the exact construction and operation shown and described, and accordingly, all suitable modifications and equivalents may be resorted to, falling within the scope of the invention.

What is claimed is:

1. A method of using a seedling raising device, said method comprising the steps of:
    obtaining the seedling raising device comprising:
        a elongated biodegradable paper strip, the paper strip having a front surface and a back surface;
        a plurality of distance markers embossed on the front surface of the paper strip;
        an adhesive layer attached to the front surface of the paper strip;
        a plurality of seeds attached to the adhesive layer;
        a fertilizer attached to the adhesive layer;
        a plurality of stakes; and
        a sticker sheet having a plurality of labels reversibly attached to the sticker sheet;
    hoeing a furrow in a garden;
    stretching the device lengthwise along the furrow;
    cutting off a first section of the device so that the cutoff first section of the device is approximately the same length as the furrow;
    placing the first section of the device into the furrow,
    burying the first section of the device in the furrow with some dirt;
    pounding a first stake of the plurality of stakes into a first end of the furrow;
    inserting a second stake of the plurality of stakes into a second end of the furrow;
    removing a first label from the sticker sheet;
    sticking the first label onto the first stake;
    peeling off a second label from the sticker sheet; and
    adhering the second label onto the second stake,
        wherein said steps of obtaining, hoeing, stretching, cutting, placing, and burying are performed prior to said steps of pounding, inserting, removing, sticking, peeling, and adhering.

2. A method of using a seedling raising device, said method comprising the steps of:
    obtaining the seedling raising device comprising:
        a elongated biodegradable paper strip, the paper strip having a front surface and a back surface;
        a plurality of distance markers embossed on the front surface of the paper strip;
        an adhesive layer attached to the front surface of the paper strip;
        a plurality of seeds attached to the adhesive layer;
        a fertilizer attached to the adhesive layer;
        a plurality of stakes; and
        a sticker sheet having a plurality of labels reversibly attached to the sticker sheet;
    hoeing a furrow in a garden;
    stretching the device lengthwise along the furrow;
    cutting off a first section of the device so that the cutoff first section of the device is approximately the same length as the furrow;
    placing the firs section of the device into the furrow;
    burying the first section of the device in the furrow with some dirt;
    pounding a first stake of the plurality of stakes into a first end of the furrow;
    inserting a second stake of the plurality of stakes into a second end of the furrow;
    removing a first label from the sticker sheet;
    sticking the first label onto the first stake;
    peeling off a second label from the sticker sheet;
    adhering the second label onto the second stake;
    getting a piece of string having a length greater than the length of the distance between the first and second stakes;
    tying the string to the first and second stakes;
    sprinkling water along the length of the furrow; and
    pulling any weeds that may grow along the length of the furrow,
        wherein said steps of obtaining, hoeing, stretching cutting, placing, and burying are performed prior to said steps of pounding, inserting, removing, sticking, peeling, and adhering,
        wherein said steps of obtaining, hoeing, stretching, cutting, placing, burying, pounding, inserting, removing, sticking, peeling, and adhering are performed prior to said steps of getting and tying, and
        wherein said steps of obtaining, hoeing, stretching, cutting, placing, burying, pounding, inserting, removing, sticking, peeling, adhering, getting, and tying are performed prior to said steps of sprinkling and pulling.

* * * * *